(12) United States Patent
Suemura et al.

(10) Patent No.: US 11,961,636 B2
(45) Date of Patent: Apr. 16, 2024

(54) SILICA-CONTAINING INSULATING COMPOSITION

(71) Applicant: NISSAN CHEMICAL CORPORATION, Tokyo (JP)

(72) Inventors: Naohiko Suemura, Sodegaura (JP); Masatoshi Sugisawa, Sodegaura (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 1008 days.

(21) Appl. No.: 16/645,750

(22) PCT Filed: Sep. 7, 2018

(86) PCT No.: PCT/JP2018/033283
§ 371 (c)(1),
(2) Date: Mar. 9, 2020

(87) PCT Pub. No.: WO2019/050008
PCT Pub. Date: Mar. 14, 2019

(65) Prior Publication Data
US 2020/0286644 A1 Sep. 10, 2020

(30) Foreign Application Priority Data

Sep. 7, 2017 (JP) ................................. 2017-171967

(51) Int. Cl.
*H01B 3/40* (2006.01)
*C01B 33/143* (2006.01)
*C01B 33/149* (2006.01)

(52) U.S. Cl.
CPC ........... *H01B 3/40* (2013.01); *C01B 33/1435* (2013.01); *C01B 33/149* (2013.01)

(58) Field of Classification Search
CPC .............. C01B 33/1435; C01B 33/149; C01B 33/1417; C01B 33/142; C01B 33/145;
(Continued)

(56) References Cited

U.S. PATENT DOCUMENTS 9,777,141 B2 * 10/2017 Yoshitake ................ C08K 9/06
2001/0004651 A1 6/2001 Tomiyoshi et al.
(Continued)

FOREIGN PATENT DOCUMENTS

EP 1 252 095 B1 11/2004
EP 2 251 304 A1 11/2010
(Continued)

OTHER PUBLICATIONS

Nov. 29, 2022 Office Action Issued in European Patent Application No. 18853127.1.
(Continued)

*Primary Examiner* — Samir Shah
*Assistant Examiner* — Jordan W Taylor
(74) *Attorney, Agent, or Firm* — Oliff PLC

(57) ABSTRACT

An insulating composition containing silica particles, a resin, and a curing agent, wherein: when an aqueous solution of the silica particles having an $SiO_2$ concentration of 3.8% by mass is heated at 121° C. for 20 hours, the amount of Na ions eluted from the silica particles is 40 ppm/$SiO_2$ or less, especially, wherein the amount of Na ions eluted from the silica particles after the heating may be 5-38 ppm/$SiO_2$, and, the silica particles may contain a polyvalent metal oxide so the ratio by mole of a polyvalent metal M to Si is 0.001-0.02; the mass ratio of $Na_2O/SiO_2$ in the silica particles may be 700-1,300 ppm; and the silica particles may have, on the surfaces thereof, a layer having a thickness of 0.1-1.5 nm and an $Na_2O/SiO_2$ mass ratio of 10-400 ppm, and may have an average particle diameter of 5-40 nm.

11 Claims, 3 Drawing Sheets

(58) Field of Classification Search
CPC ... C01B 33/146; C01B 33/18; C01P 2004/32; C01P 2004/64; C01P 2006/80; C08J 3/20; C08K 3/36; C08K 9/06; C08L 101/00; H01B 3/00; H01B 3/002; H01B 3/30; H01B 3/40

See application file for complete search history.

(56) References Cited

U.S. PATENT DOCUMENTS

2010/0311871 A1* 12/2010 Suemura ............... C01B 33/146
                                                                              427/217
2014/0299350 A1* 10/2014 Kikuchi ................. H01B 3/308
                                                                              174/110 SR
2016/0130425 A1    5/2016 Yoshitake et al.

FOREIGN PATENT DOCUMENTS

| JP | S58-029858 | A |   | 2/1983 |   |   |
|---|---|---|---|---|---|---|
| JP | H03-187913 | A |   | 8/1991 |   |   |
| JP | H11-199218 | A |   | 7/1999 |   |   |
| JP | 2001-220496 | A |   | 8/2001 |   |   |
| JP | 2006-008754 | A |   | 1/2006 |   |   |
| JP | 2010-254548 | A |   | 11/2010 |   |   |
| JP | 2016-079195 | A |   | 5/2016 |   |   |
| JP | 2016222507 | A | * | 12/2016 | ............. | B32B 17/10 |
| JP | 2017-095547 | A |   | 6/2017 |   |   |
| KR | 10-2010-0138920 | A |   | 12/2010 |   |   |
| WO | 2009/101974 | A1 |   | 8/2009 |   |   |
| WO | 2014/199904 | A1 |   | 12/2014 |   |   |

OTHER PUBLICATIONS

Dec. 4, 2018 International Search Report issued in International Patent Application No. PCT/JP2018/033283.

Dec. 4, 2018 Written Opinion of the International Searching Authority issued in International Patent Application No. PCT/JP2018/033283.

Jun. 1, 2021 Extended Search Report issued in European Patent Application No. 18853127.1.

Feb. 20, 2023 Office Action issued in Korean Patent Application No. 10-2020-7007578.

* cited by examiner

DIELECTRIC BREAKDOWN LIFE (hr)

DIELECTRIC BREAKDOWN LIFE (hr)

SILICA-CONTAINING INSULATING COMPOSITION

TECHNICAL FIELD

The present invention relates to an insulating composition containing silica particles, and to an insulating product produced from the composition.

BACKGROUND ART

Hitherto, many resins having improved mechanical strength, chemical resistance, electrical properties, etc. have been widely used in, for example, electric and electronic parts, automotive parts, and other mechanical parts. In accordance with a recent trend of miniaturization of electronic devices, parts of the devices have been downsized and thinned, resulting in a further reduction in insulation distance. Thus, a demand has arisen for further improvement in the dielectric breakdown resistance of a molded product and in the insulating property of an insulating resin. Such an insulating resin is supplemented with glass fiber, a certain type of a colorant, or another additive for the purpose of improving the electrical properties and other properties of the resin, or supplemented with a flame retardant for imparting flame retardancy to the resin. However, incorporation of, for example, such an additive to an insulating resin is known to cause deterioration of electrical properties, such as dielectric breakdown resistance and tracking resistance, and thus a limitation is imposed on the use of the resin in electric and electronic parts.

In order to meet the aforementioned demand, attempts have been made to improve the insulating properties of components to be incorporated into a composition.

For example, a coating composition having partial discharge resistance has been disclosed which contains a polyimide coating material containing a polyimide precursor and an organic solvent, and an organosilica sol containing silica particles and a dispersion medium for dispersing the silica particles in the polyimide coating material, wherein the amount of sodium ions contained in the silica particles is $5 \times 10^{-3}$ wt % or less relative to the weight of the silica particles (see Patent Documents 1 and 2).

PRIOR ART DOCUMENTS

Patent Documents

Patent Document 1: Japanese Unexamined Patent Application Publication No. 2017-095547 (JP 2017-095547 A)

Patent Document 2: Japanese Unexamined Patent Application Publication No. 2016-079195 (JP 2016-079195 A)

SUMMARY OF THE INVENTION

Problems to be Solved by the Invention

The present invention provides an insulating composition containing silica particles, a resin, and a curing agent, wherein elution of Na ions from the silica particles is prevented or reduced, and the composition undergoes a small change in insulating property over time.

Means for Solving the Problems

A first aspect of the present invention is an insulating composition comprising silica particles (A), a resin (B), and a curing agent (C), wherein:

when an aqueous solution of the silica particles (A) having an $SiO_2$ concentration of 3.8% by mass is heated at 121° C. for 20 hours, the amount of Na ions eluted from the silica particles (A) is 40 ppm/$SiO_2$ or less.

A second aspect of the present invention is the insulating composition according to the first aspect, wherein the amount of Na ions eluted from the silica particles (A) after the heating is 5 to 38 ppm/$SiO_2$.

A third aspect of the present invention is the insulating composition according to the first aspect, wherein:

the silica particles (A) contain a polyvalent metal oxide such that the ratio by mole of a polyvalent metal M to Si is 0.001 to 0.02;

the mass ratio of $Na_2O/SiO_2$ in the silica particles is 700 to 1,300 ppm; and the silica particles have, on the surfaces thereof, a layer having a thickness of 0.1 to 1.5 nm and an $Na_2O/SiO_2$ mass ratio of 10 to 400 ppm, and have an average particle diameter of 5 to 40 nm.

A fourth aspect of the present invention is a method for producing the insulating composition according to any one of the first to third aspects, the method comprising:

a step of preparing an aqueous sol of silica particles (A);

a step (1) of replacing the aqueous medium of the aqueous sol of the silica particles (A) with an organic medium, to produce an organic medium sol of the silica particles (A); and a step (2) of mixing the organic medium sol of the silica particles (A) produced in the step (1) with a resin (B) and a curing agent (C).

A fifth aspect of the present invention is the method for producing the insulating composition according to the fourth aspect, wherein the aqueous sol of the silica particles (A) is produced through:

a step of preparing an aqueous dispersion of silica particles (a) by heating a silicate liquid obtained by cation exchange of an aqueous alkali silicate solution, and the following steps (I) and (II):

step (I): a step of subjecting the aqueous dispersion of the silica particles (a) to any one of the following steps (I-i) to (I-iii):

step (I-i): a step of maintaining the aqueous dispersion at room temperature to 50° C. under acidic conditions with a pH of 1 to 4, step (I-ii): a step of heating the aqueous dispersion at 100 to 200° C., and step (I-iii): combination of the steps (I-i) and (I-ii); and step (II): a step of subjecting the aqueous dispersion of the silica particles (a) that has been subjected to the step (I) to the following step (II-i) or (II-ii):

step (II-i): a step of performing cation exchange and anion exchange sequentially, or step (II-ii): a step of performing cation exchange, anion exchange, and cation exchange sequentially.

A sixth aspect of the present invention is the method for producing the insulating composition according to the fifth aspect, wherein the pH is adjusted to 1 to 4 in the step (I-i) by adding an acid to the aqueous dispersion of the silica particles (a).

A seventh aspect of the present invention is the method for producing the insulating composition according to the fourth aspect, wherein the aqueous sol of the silica particles (A) is produced through:

a step of preparing an aqueous dispersion of silica particles (a) by heating a silicate liquid obtained by cation exchange of an aqueous alkali silicate solution, and a step of adding, to the aqueous dispersion of the silica particles (a), a silane compound of the following Formula (1):

Formula (1)

(wherein R is a $C_{1-10}$ alkyl group, an epoxy group, an epoxy group-containing organic group, a phenyl group, a phenyl group-containing organic group, or any combination of these, and is bonded to the silicon atom via an Si—C bond; a is an integer of 0 to 3; and X is an alkoxy group, an acyloxy group, or a halogen group), to coat the surfaces of the silica particles (a) with a hydrolysis product or hydrolysis condensate of the silane compound of Formula (1).

An eighth aspect of the present invention is the method for producing the insulating composition according to the seventh aspect, wherein the step of coating the silica particles (a) with a hydrolysis product or hydrolysis condensate of the silane compound of Formula (1) comprises:

a step of coating the silica particles (a) with a hydrolysis product or hydrolysis condensate of the silane compound of Formula (1) wherein a is 0; and a step of further coating the silica particles (a) with a hydrolysis product or hydrolysis condensate of the silane compound of Formula (1) wherein a is 1 or 2.

A ninth aspect of the present invention is the method for producing the insulating composition according to the seventh aspect, wherein the silane compound of Formula (1) wherein a is 0 is tetraethoxysilane or tetramethoxysilane, and the silane compound of Formula (1) wherein a is 1 or 2 is silane having an epoxy group-containing organic group, silane having a phenyl group, or a combination of these.

A tenth aspect of the present invention is the method for producing the insulating composition according to the seventh aspect, wherein the mass ratio of the silica particles (a) to a hydrolysis product or hydrolysis condensate of the silane compound of Formula (1) is 100:2 to 100:100.

An eleventh aspect of the present invention is a method for producing the insulating composition according to any one of the first to third aspects, the method comprising:

a step of preparing an aqueous sol of silica particles (A);

a step (1) of replacing the aqueous medium of the aqueous sol of the silica particles (A) with an organic medium, to thereby produce an organic medium sol of the silica particles (A); and a step (2) of mixing the organic medium sol of the silica particles (A) produced in the step (1) with a resin (B) and a curing agent (C), wherein the aqueous sol of the silica particles (A) is prepared through:

a step of preparing an aqueous dispersion of silica particles (a) by heating a silicate liquid obtained by cation exchange of an aqueous alkali silicate solution;

a step of subjecting the aqueous dispersion of the silica particles (a) to the steps (I) and (II) described in the fifth or sixth aspect; and a step of coating the surfaces of the silica particles (a) with a hydrolysis product or hydrolysis condensate of the silane compound of Formula (1) described in any one of the seventh to tenth aspects.

A twelfth aspect of the present invention is a method for producing a substrate, the method comprising a step of applying the insulating composition according to any one of the first to third aspects onto a substrate, and a step of heating the composition.

Effects of the Invention

Hitherto, addition of silica (silica particles) to an insulating composition has been performed for improving electrical properties and mechanical properties. In many cases, the addition of silica is performed by a method involving production of a silica sol by heating a silicate liquid obtained by cation exchange of an aqueous alkali silicate solution, replacement of the aqueous dispersion medium of the sol with an organic solvent for improving the compatibility of the sol with a resin, and then incorporation of the sol into the resin.

However, silica particles in the silica sol produced by the aforementioned method contain alkali metal ions even after cation exchange. Thus, subsequent adsorption of moisture in the air to alkali metal ions (in particular, sodium ions) eluted from the silica particles may cause deterioration of insulating property.

In the present invention, in order to reduce elution of sodium ions from the surfaces of silica particles, an aqueous sol of silica particles is produced, and then, for example, the pH of the aqueous sol is maintained in an acidic region by addition of an acid, to thereby remove elutable sodium ions from the surfaces or surface layers of the silica particles, followed by elimination of the sodium ions from the reaction system through cation exchange. Thus, sodium ions are eliminated or reduced in silica particles used in the present invention. Therefore, a substrate having an insulating coating film formed through application of the insulating composition containing the silica particles can be prevented from undergoing deterioration of insulating property, which may be caused by adsorption of moisture in the air to sodium ions.

Alternatively, in order to reduce elution of sodium ions from the surfaces of silica particles, an aqueous sol of silica particles is produced, and then the surfaces of the silica particles are coated with a hydrolysis condensate of a silane compound. In this case, since the silica particles are coated with a hydrolysis product or hydrolysis condensate of the silane compound, which contains almost no sodium ions, elution of sodium ions from the surfaces of the silica particles is prevented.

As described above, elution of sodium ions from the surfaces of silica particles used in the present invention is reduced or prevented. Thus, a cured product produced from the insulating composition of the present invention containing the silica particles is less likely to undergo deterioration of insulating property.

MODES FOR CARRYING OUT THE INVENTION

[Insulating Composition]

Figure 1:
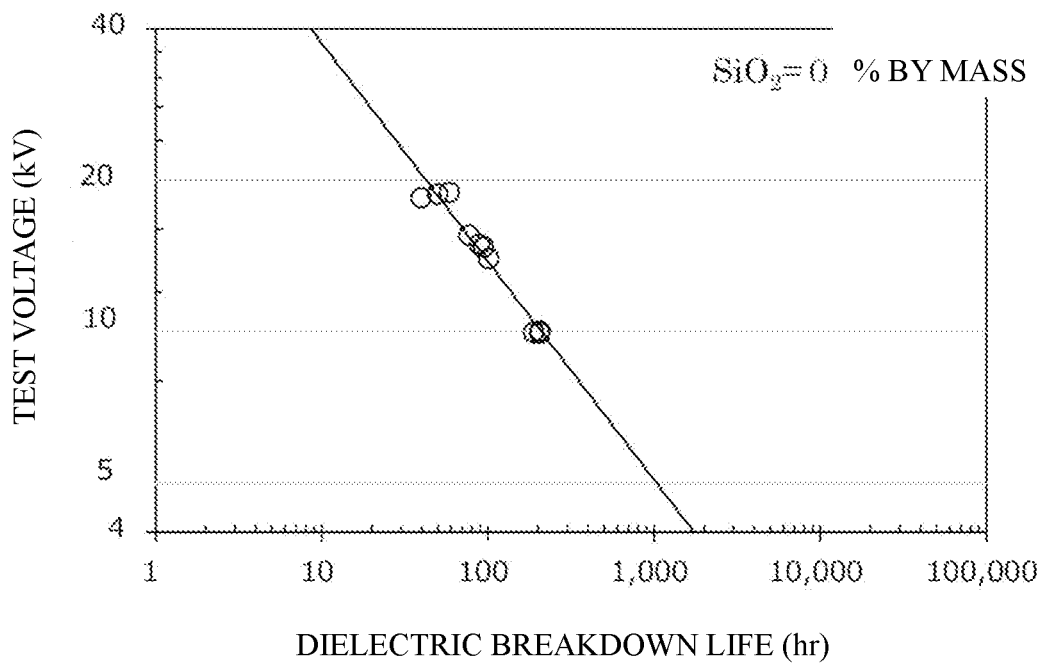
FIG. 1 shows the dielectric breakdown life of a cured product produced from an epoxy resin composition containing no silica particles (i.e., containing only an epoxy resin and a curing agent) at an applied voltage of 20 kV, 15 kV, or 10 kV, and the presumed dielectric breakdown life of the cured product at 5 kV.

The present invention is directed to an insulating composition comprising silica particles (A), a resin (B), and a curing agent (C), wherein the silica particles (A) are such that when an aqueous dispersion of the silica particles having an $SiO_2$ concentration of 3.8% by mass is heated at 121° C. for 20 hours, the amount of Na ions eluted from the silica particles is 40 ppm/$SiO_2$ or less.

<Silica Particles (A)>

In the present invention, the silica particles (A) are such that the amount of Na ions eluted from the silica particles after heating under the conditions described above is 40 ppm/$SiO_2$ or less, preferably 5 to 38 ppm/$SiO_2$ from a practical viewpoint.

Preferably, the silica particles (A) contain a polyvalent metal oxide such that the ratio by mole of a polyvalent metal M to Si is 0.001 to 0.02, the mass ratio of $Na_2O/SiO_2$ in the silica particles is 700 to 1,300 ppm, and the silica particles have, on the surfaces thereof, a layer having a thickness of 0.1 to 1.5 nm and an $Na_2O/SiO_2$ mass ratio of 10 to 400 ppm (i.e., a layer containing a reduced amount of Na ions) and have an average particle diameter of 5 to 40 nm.

The aforementioned polyvalent metal oxide is based on an alkali silicate serving as a raw material of silica particles.

The silica particles usable in the present invention can be prepared from an aqueous silica sol (an aqueous dispersion of silica particles) obtained by any known method like a conventional case. For example, the aqueous silica sol is prepared by heating a silicate liquid obtained by cation exchange of an aqueous alkali silicate (in particular, sodium silicate) solution. As described below, in the aqueous silica sol (i.e., aqueous dispersion of silica particles) used in the present invention, for example, the silica particles can be subjected to surface treatment, or the medium (dispersion medium) can be replaced.

The alkali silicate serving as a raw material contains a polyvalent metal besides silicon, and the polyvalent metal forms the aforementioned polyvalent metal oxide. Examples of the polyvalent metal include iron, aluminum, zinc, zirconium, titanium, tin, and lead.

The silica particles (A) are based on a silica sol.

The silica particles (A) may have an average particle diameter of 5 to 40 nm.

The "average particle diameter" as used herein corresponds to a specific surface area diameter (D (nm)) obtained by the following formula: $D (nm) = 2{,}720/S$ wherein S is a specific surface area ($m^2/g$) measured by the nitrogen adsorption method, and the average particle diameter may be the average of primary particle diameters (average primary particle diameter).

<Production Method for Insulating Composition>

The insulating composition of the present invention can be produced by a method including a step of preparing an aqueous sol of silica particles (A), a step (1) of replacing the aqueous medium of the aqueous sol of the silica particles (A) with an organic medium (organic solvent), to thereby produce an organic medium sol of the silica particles (A) (hereinafter may be referred to as "organic solvent-dispersed silica sol"), and a step (2) of mixing the organic medium sol of the silica particles (A) produced in the step (1) with a resin (B) and a curing agent (C).

The insulating composition of the present invention may contain the silica particles (A) in an amount of 2 to 50% by mass, the resin (B) in an amount of 20 to 90% by mass, and the curing agent (C) in an amount of 0.1 to 60% by mass.

The insulating composition may optionally further contain, for example, a curing promoter (reaction promoter) or a reactive diluent.

The aforementioned amount corresponds to a value relative to the total amount (solid content) (taken as 100% by mass) of the silica particles (A), the resin (B), the curing agent (C), and the optional component (e.g., a curing promoter).

The insulating composition may have a solid content of 10 to 100% by mass. The solid content corresponds to the amount of all components of the insulating composition, except for the amount of a solvent. Thus, the solvent is a component of the composition besides the solid content and corresponds to, for example, the organic solvent of the organic medium sol of the silica particles (A).

In the present invention, the composition may be prepared by removal of the organic solvent after mixing of the organic medium sol of the silica particles (A), the resin (B), and the curing agent (C). In this case, the composition can have a solid content of about 100% by mass, and curing shrinkage of the composition can be reduced.

The organic solvent of the aforementioned organic solvent-dispersed silica sol may be, for example, an alcohol, an ether, a ketone, an ester, an amide, a hydrocarbon, or a nitrile.

Examples of the alcohol include methanol, ethanol, 1-propanol, 2-propanol, 1-butanol, isobutyl alcohol, 2-butanol, ethylene glycol, glycerin, propylene glycol, triethylene glycol, polyethylene glycol, benzyl alcohol, 1,5-pentanediol, and diacetone alcohol.

Examples of the ether include diethyl ether, dibutyl ether, tetrahydrofuran, dioxane, ethylene glycol monomethyl ether, ethylene glycol monopropyl ether, propylene glycol monomethyl ether, propylene glycol monoethyl ether, diethylene glycol monomethyl ether, diethylene glycol monoethyl ether, and diethylene glycol monobutyl ether.

Examples of the ketone include acetone, methyl ethyl ketone, 2-pentanone, 3-pentanone, methyl isobutyl ketone, 2-heptanone, and cyclohexanone.

Examples of the ester include ethyl formate, methyl acetate, ethyl acetate, propyl acetate, butyl acetate, ethylene glycol monoethyl ether acetate, ethylene glycol monobutyl ether acetate, and propylene glycol monomethyl ether acetate.

Examples of the amide include acetamide, N,N-dimethylformamide, N,N-dimethyl acetamide, and N-methyl-2-pyrrolidone.

Examples of the hydrocarbon include n-hexane, cyclohexane, benzene, toluene, xylene, solvent naphtha, and styrene. Examples of the halogenated hydrocarbon include dichloromethane and trichloroethylene.

Examples of the nitrile include acetonitrile, glutaronitrile, methoxyacetonitrile, propionitrile, and benzonitrile.

Examples of other organic solvents include dimethyl sulfoxide.

The organic solvent-dispersed silica sol has an $SiO_2$ concentration of 5 to 70% by mass, preferably 15 to 60% by mass.

<Production Method (1) for Aqueous Sol of Silica Particles (A)>

The aqueous sol of the silica particles (A) used in the present invention can be produced through a step of preparing an aqueous dispersion of silica particles (a) by heating a silicate liquid obtained by cation exchange of an aqueous alkali silicate solution, and the following steps (I) and (II):

step (I): a step of subjecting the aqueous dispersion of the silica particles (a) to any one of the following steps (I-i) to (I-iii):

step (I-i): a step of maintaining the aqueous dispersion at room temperature to 50° C. under acidic conditions with a pH of 1 to 4, step (I-ii): a step of heating the aqueous dispersion at 100 to 200° C., and step (I-iii): combination of the steps (I-i) and (I-ii); and step (II): a step of subjecting the aqueous dispersion of the silica particles (a) that has undergone the step (I) to the following step (II-i) or (II-ii):

step (II-i): a step of performing cation exchange and anion exchange sequentially, or step (II-ii): a step of performing cation exchange, anion exchange, and cation exchange sequentially.

<<Step (I)>>

Step (I-i) in step (I): The step of maintaining the aqueous dispersion at room temperature to 50° C. under acidic conditions with a pH of 1 to 4 involves removal of sodium ions from the surfaces or surface layers of the silica particles (a) contained in the aqueous dispersion of the silica particles (a) by using an acid, to thereby form silica particles (A) having a layer containing a reduced amount of sodium ions. The pH is adjusted to 1 to 4 by adding an acid (e.g., sulfuric acid, nitric acid, or hydrochloric acid) to the aqueous dispersion of the silica particles (a).

Step (I-ii) in step (I): The step of heating the aqueous dispersion at 100 to 200° C. involves removal of sodium ions from the surfaces or surface layers of the silica particles (a) contained in the aqueous dispersion of the silica particles (a) by using an autoclave, to thereby form silica particles (A) having a layer containing a reduced amount of sodium ions.

In the step (I), the step (I-i) and the step (I-ii) may be used in combination (step (I-iii)). In this case, no particular limitation is imposed on the order of these steps. For example, the step (I-ii) may be followed by the step (I-i).

<<Step (II)>>

The aqueous sol of the silica particles (A) is produced through the step (II) after the step (I).

The step (II) is either the step (II-i) of performing cation exchange and anion exchange sequentially, or the step (II-ii) of performing cation exchange, anion exchange, and cation exchange sequentially. When the aqueous sol of the silica particles (A) is subjected to the step (II-ii), the amount of ions remaining in the aqueous sol is further reduced.

<Production Method (2) for Aqueous Sol of Silica Particles (A)>

In the present invention, the aqueous sol of the silica particles (A) can also be produced through a step of preparing an aqueous dispersion of silica particles (a) by heating a silicate liquid obtained by cation exchange of an aqueous alkali silicate solution, and a step of adding, to the aqueous dispersion of the silica particles (a), a silane compound of Formula (1), to thereby coat the surfaces of the silica particles (a) with a hydrolysis product or hydrolysis condensate of the silane compound of Formula (1).

In the silane compound of Formula (1), the group R is bonded to the silicon atom via an Si—C bond.

Examples of the $C_{1-10}$ alkyl group represented by R include linear or branched alkyl groups having a carbon atom number of 1 to 10, such as methyl group, ethyl group, n-propyl group, i-propyl group, n-butyl group, i-butyl group, s-butyl group, t-butyl group, n-pentyl group, 1-methyl-n-butyl group, 2-methyl-n-butyl group, 3-methyl-n-butyl group, 1,1-dimethyl-n-propyl group, 1,2-dimethyl-n-propyl group, 2,2-dimethyl-n-propyl group, 1-ethyl-n-propyl group, n-hexyl group, 1-methyl-n-pentyl group, 2-methyl-n-pentyl group, 3-methyl-n-pentyl group, 4-methyl-n-pentyl group, 1,1-dimethyl-n-butyl group, 1,2-dimethyl-n-butyl group, 1,3-dimethyl-n-butyl group, 2,2-dimethyl-n-butyl group, 2,3-dimethyl-n-butyl group, 3,3-dimethyl-n-butyl group, 1-ethyl-n-butyl group, 2-ethyl-n-butyl group, 1,1,2-trimethyl-n-propyl group, 1,2,2-trimethyl-n-propyl group, 1-ethyl-1-methyl-n-propyl group, and 1-ethyl-2-methyl-n-propyl group.

The aforementioned alkyl group may be a cyclic alkyl group. Examples of the cyclic alkyl group having a carbon atom number of 1 to 10 include cyclopropyl group, cyclobutyl group, 1-methyl-cyclopropyl group, 2-methyl-cyclopropyl group, cyclopentyl group, 1-methyl-cyclobutyl group, 2-methyl-cyclobutyl group, 3-methyl-cyclobutyl group, 1,2-dimethyl-cyclopropyl group, 2,3-dimethyl-cyclopropyl group, 1-ethyl-cyclopropyl group, 2-ethyl-cyclopropyl group, cyclohexyl group, 1-methyl-cyclopentyl group, 2-methyl-cyclopentyl group, 3-methyl-cyclopentyl group, 1-ethyl-cyclobutyl group, 2-ethyl-cyclobutyl group, 3-ethyl-cyclobutyl group, 1,2-dimethyl-cyclobutyl group, 1,3-dimethyl-cyclobutyl group, 2,2-dimethyl-cyclobutyl group, 2,3-dimethyl-cyclobutyl group, 2,4-dimethyl-cyclobutyl group, 3,3-dimethyl-cyclobutyl group, 1-n-propyl-cyclopropyl group, 2-n-propyl-cyclopropyl group, 1-i-propyl-cyclopropyl group, 2-i-propyl-cyclopropyl group, 1,2,2-trimethyl-cyclopropyl group, 1,2,3-trimethyl-cyclopropyl group, 2,2,3-trimethyl-cyclopropyl group, 1-ethyl-2-methyl-cyclopropyl group, 2-ethyl-1-methyl-cyclopropyl group, 2-ethyl-2-methyl-cyclopropyl group, and 2-ethyl-3-methyl-cyclopropyl group.

In the compound of Formula (1), the epoxy group represented by R may be directly bonded to the silicon atom (R=epoxy group), and the epoxy group-containing organic group may be, for example, an epoxy group bonded to the silicon atom via a $C_{1-10}$ alkylene group or ether group.

Examples of the alkylene group include organic groups prepared by removal of one hydrogen atom from any of the above-exemplified alkyl groups, such as ethylene group and propylene group.

In the compound of Formula (1), the phenyl group represented by R may be directly bonded to the silicon atom (R=phenyl group), and the phenyl group-containing organic group may be, for example, a phenyl group bonded to the silicon atom via a $C_{1-10}$ alkylene group.

Examples of the alkylene group include organic groups prepared by removal of one hydrogen atom from any of the above-exemplified alkyl groups, such as ethylene group and propylene group. The phenyl group may be a substituted phenyl group.

In the compound of Formula (1), the alkoxy group represented by X is, for example, an alkoxy group having a linear, branched, or cyclic alkyl moiety having a carbon atom number of 1 to 20. Examples of the linear or branched alkoxy group include methoxy group, ethoxy group, n-propoxy group, i-propoxy group, n-butoxy group, i-butoxy group, s-butoxy group, t-butoxy group, n-pentyloxy group, 1-methyl-n-butoxy group, 2-methyl-n-butoxy group, 3-methyl-n-butoxy group, 1,1-dimethyl-n-propoxy group, 1,2-dimethyl-n-propoxy group, 2,2-dimethyl-n-propoxy group, 1-ethyl-n-propoxy group, n-hexyloxy group, 1-methyl-n-pentyloxy group, 2-methyl-n-pentyloxy group, 3-methyl-n-pentyloxy group, 4-methyl-n-pentyloxy group, 1,1-dimethyl-n-butoxy group, 1,2-dimethyl-n-butoxy group, 1,3-dimethyl-n-butoxy group, 2,2-dimethyl-n-butoxy group, 2,3-dimethyl-n-butoxy group, 3,3-dimethyl-n-butoxy group, 1-ethyl-n-butoxy group, 2-ethyl-n-butoxy group, 1,1,2-trimethyl-n-propoxy group, 1,2,2-trimethyl-n-propoxy group, 1-ethyl-1-methyl-n-propoxy group, and 1-ethyl-2-methyl-n-propoxy group. Examples of the cyclic alkoxy group include cyclopropoxy group, cyclobutoxy group, 1-methyl-cyclopropoxy group, 2-methyl-cyclopropoxy group, cyclopentyloxy group, 1-methyl-cyclobutoxy group, 2-methyl-cyclobutoxy group, 3-methyl-cyclobutoxy group, 1,2-dimethyl-cyclopropoxy group, 2,3-dimethyl-cyclopropoxy group, 1-ethyl-cyclopropoxy group, 2-ethyl-cyclopropoxy group, cyclohexyloxy group, 1-methyl-cyclopentyloxy group, 2-methyl-cyclopentyloxy group, 3-methyl-cyclopentyloxy group, 1-ethyl-cyclobutoxy group, 2-ethyl-cyclobutoxy group, 3-ethyl-cyclobutoxy group, 1,2-dimethyl-cyclobutoxy group, 1,3-dimethyl-cyclobutoxy group, 2,2-dimethyl-cyclobutoxy group, 2,3-dimethyl-cyclobutoxy group, 2,4-dimethyl-cyclobutoxy group, 3,3-dimethyl-cyclobutoxy group, 1-n-propyl-cyclopropoxy group, 2-n-propyl-cyclopropoxy group, 1-i-propyl-cyclopropoxy group, 2-i-propyl-cyclopropoxy group, 1,2,2-trimethyl-cyclopropoxy group, 1,2,3-trimethyl-cyclopropoxy group, 2,2,3-trimethyl-cyclopropoxy group, 1-ethyl-2-methyl-cyclopropoxy group, 2-ethyl-1-methyl-cyclopropoxy group, 2-ethyl-2-methyl-cyclopropoxy group, and 2-ethyl-3-methyl-cyclopropoxy group.

Examples of the acyloxy group represented by X include $C_{2-20}$ acyloxy groups, such as methylcarbonyloxy group, ethylcarbonyloxy group, n-propylcarbonyloxy group, i-propylcarbonyloxy group, n-butylcarbonyloxy group, i-butylcarbonyloxy group, s-butylcarbonyloxy group, t-butylcarbonyloxy group, n-pentylcarbonyloxy group, 1-methyl-n-butylcarbonyloxy group, 2-methyl-n-butylcarbonyloxy group, 3-methyl-n-butylcarbonyloxy group, 1,1-dimethyl-n-propylcarbonyloxy group, 1,2-dimethyl-n-propylcarbonyloxy group, 2,2-dimethyl-n-propylcarbonyloxy group, 1-ethyl-n-propylcarbonyloxy group, n-hexylcarbonyloxy group, 1-methyl-n-pentylcarbonyloxy group, 2-methyl-n-pentylcarbonyloxy group, 3-methyl-n-pentylcarbonyloxy group, 4-methyl-n-pentylcarbonyloxy group, 1,1-dimethyl-n-butylcarbonyloxy group, 1,2-dimethyl-n-butylcarbonyloxy group, 1,3-dimethyl-n-butylcarbonyloxy group, 2,2-dimethyl-n-butylcarbonyloxy group, 2,3-dimethyl-n-butylcarbonyloxy group, 3,3-dimethyl-n-butylcarbonyloxy group, 1-ethyl-n-butylcarbonyloxy group, 2-ethyl-n-butylcarbonyloxy group, 1,1,2-trimethyl-n-propylcarbonyloxy group, 1,2,2-trimethyl-n-propylcarbonyloxy group, 1-ethyl-1-methyl-n-propylcarbonyloxy group, 1-ethyl-2-methyl-n-propylcarbonyloxy group, phenylcarbonyloxy group, and tosylcarbonyloxy group.

Examples of the halogen group represented by X include fluorine, chlorine, bromine, and iodine.

In the case of coating with a hydrolysis product or hydrolysis condensate of the silane compound of Formula (1), preferably, the silica particles (a) are coated with a hydrolysis product or hydrolysis condensate of the silane compound of Formula (1) wherein a is 0, and then coated with a hydrolysis product or hydrolysis condensate of the silane compound of Formula (1) wherein a is 1 or 2; i.e., a two-layer structure is formed on the silica particles (a) by this two-step coating.

In the case of coating with a hydrolysis product or hydrolysis condensate of the silane compound of Formula (1), the silica particles (a) may be coated with a hydrolysis product or hydrolysis condensate of the silane compound of Formula (1) wherein a is 0, and then coated with a hydrolysis product or hydrolysis condensate of the silane compound of Formula (1) wherein a is 1; i.e., a two-layer structure may be formed on the silica particles (a) by this two-step coating.

The first coating with a hydrolysis product or hydrolysis condensate of the silane compound of Formula (1) wherein a is 0 is preferably performed by using a hydrolysis product or hydrolysis condensate of tetraethoxysilane or tetramethoxysilane.

The second coating with a hydrolysis product or hydrolysis condensate of the silane compound of Formula (1) wherein a is 1 or 2 is preferably performed by using silane having an epoxy group-containing organic group, such as 3-glycidoxypropyltrimethoxysilane, 3-glycidoxypropyltriethoxysilane, 3-glycidoxypropylmonomethyldimethoxysilane, or 3-glycidoxypropylmonomethyldiethoxysilane, silane having a phenyl group, such as phenyltrimethoxysilane, phenyltriethoxysilane, phenylmonomethyldimethoxysilane, or phenylmonomethyldiethoxysilane, or any combination of these.

The hydrolyzable group of the silane compound of Formula (1): —Si—X group (i.e., alkoxysilyl group, acyloxysilyl, or halogenated silyl group) is hydrolyzed with water, and the amount of water is 0.5 to 100 mol, preferably 1 to 10 mol, relative to 1 mol of the hydrolyzable group. The water used for the hydrolysis may be water contained in the aqueous dispersion of the silica particles (a).

The hydrolysis and condensation of the silane compound of Formula (1) are generally performed at a temperature of 20 to 80° C.

The hydrolysis may be complete hydrolysis or partial hydrolysis. Thus, the hydrolysis product may contain a partial hydrolysis product or a monomer.

The aforementioned hydrolysis and condensation may be performed with a catalyst (hydrolysis catalyst).

The hydrolysis catalyst may be used in an amount of 0.001 to 10 mol, preferably 0.001 to 1 mol, relative to 1 mol of the aforementioned hydrolyzable group.

Examples of the hydrolysis catalyst include a metal chelate compound, an organic acid, an inorganic acid, an organic base, and an inorganic base.

The aforementioned hydrolysis and condensation can produce a hydrolysis condensate (polyorganosiloxane) of hydrolyzable silane having a weight average molecular weight of 1,000 to 1,000,000 or 1,000 to 100,000.

The resultant hydrolysis condensate may be in the form of a mixture of the hydrolysis condensate and an incomplete hydrolysis product (i.e., a partial hydrolysis product) or a silane compound. The mixture may be used. The condensate is a polymer having a polysiloxane structure.

The mass ratio of the silica particles (a) to a hydrolysis product or hydrolysis condensate of the silane compound of Formula (1) may be 100:2 to 100:100.

The amount of a hydrolysis product or hydrolysis condensate of the silane compound of Formula (1) (i.e., the amount of coatings on the particle surfaces) can be regarded as the amount of the silane compound to be added. Thus, the mass ratio of the silica particles (a) to the silane compound of Formula (1) added to the silica particles (a) in the aforementioned solution can be regarded as 100:2 to 100:100.

<Production Method (3) for Aqueous Sol of Silica Particles (A)>

The aqueous sol of the silica particles (A) can be produced through combination of <Production Method (1) for Aqueous Sol of Silica Particles (A)> and <Production Method (2) for Aqueous Sol of Silica Particles (A)> described above.

Specifically, the aqueous sol of the silica particles (A) can be produced through a step of preparing an aqueous dispersion of silica particles (a) by heating a silicate liquid obtained by cation exchange of an aqueous alkali silicate solution, the steps (I) and (II) described in <Production Method (1) for Aqueous Sol of Silica Particles (A)>, and then the step of coating the surfaces of the silica particles (a) with a hydrolysis product or hydrolysis condensate of the silane compound of Formula (1) described in <Production Method (2) for Aqueous Sol of Silica Particles (A)>.

In <Production Method (1) for Aqueous Sol of Silica Particles (A)>, sodium ions are removed from the surfaces or surface layers of the silica particles (a), to thereby form silica particles having a layer containing a reduced amount of sodium ions. Subsequently, in <Production Method (2) for Aqueous Sol of Silica Particles (A)>, the silica particles are coated with a hydrolysis product or hydrolysis condensate of the silane compound containing almost no sodium ions, whereby elution of sodium ions from the surfaces of the silane particles is further prevented or reduced.

The silica particles (a) subjected to the steps (I) and (II) described in <Production Method (1) for Aqueous Sol of Silica Particles (A)> can be regarded as "silica particles (A)"; i.e., silica particles having a surface or surface layer containing a reduced amount of sodium ions. However, in the production method 3, the silica particles are regarded as "silica particles (a)" described in the production method 2.

[Resin (B)]

In the present invention, the resin (B) may be a polymerizable compound, such as a polymerizable compound having an ethylenically unsaturated bond, a polymerizable compound having an epoxy ring, a polymerizable compound having an oxetane ring, or a polymerizable compound having a vinyl ether structure, or a resin prepared by polymerization of such a polymerizable compound. Thus, the resin (B) in the present invention refers to both a polymerizable compound (so-called monomer) and a polymer of the compound (resin in a narrow sense). A resin prepared by polymerization of any of the aforementioned polymerizable compounds has a polymerizable functional group at an end or side chain of the resin. Such a functional group can be used for further polymerization.

Examples of the polymerizable compound having an ethylenically unsaturated bond include unsaturated carboxylic acid compounds, such as acrylic acid, methacrylic acid, itaconic acid, crotonic acid, maleic acid, and phthalic acid. The polymerizable compound may be an unsaturated carboxylic acid ester compound or an unsaturated carboxylic acid amide compound, which is derived from such an unsaturated carboxylic acid compound and an alcohol compound or an amine compound. Examples of the ester compound or the amide compound include an acrylic acid ester compound, a methacrylic acid ester compound, an itaconic acid ester compound, a crotonic acid ester compound, a maleic acid ester compound, a phthalic acid ester compound, an acrylic acid amide compound, a methacrylic acid amide compound, an itaconic acid amide compound, a crotonic acid amide compound, a maleic acid amide compound, and a phthalic acid amide compound. Examples of the alcohol compound include, but are not particularly limited to, polyol compounds having two to six hydroxy groups, such as ethylene glycol, triethylene glycol, tetraethylene glycol, tris(2-hydroxylethyl)isocyanuric acid, triethanolamine, and pentaerythritol. Examples of the amine compound include, but are not particularly limited to, polyamine compounds having two to six primary or secondary amino groups, such as ethylenediamine, diaminocyclohexane, diaminonaphthalene, 1,4-bis(aminomethyl)cyclohexane, 3,3',4,4'-tetraaminobiphenyl, and tris(2-aminoethyl)amine.

Specific examples of the polymerizable compound having an ethylenically unsaturated bond include ethylene glycol di(meth)acrylate, diethylene glycol di(meth)acrylate, triethylene glycol di(meth)acrylate, tetraethylene glycol di(meth)acrylate, nonaethylene glycol di(meth)acrylate, polyethylene glycol di(meth)acrylate, tripropylene glycol di(meth)acrylate, tetrapropylene glycol di(meth)acrylate, nonapropylene glycol di(meth)acrylate, polypropylene glycol di(meth)acrylate, 2,2-bis[4-((meth)acryloxydiethoxy)phenyl]propane, 3-phenoxy-2-propanoyl (meth)acrylate, 1,6-bis(3-(meth)acryloxy-2-hydroxypropyl)-hexyl ether, trimethylolpropane tri(meth)acrylate, glycerol tri(meth)acrylate, tris-(2-hydroxylethyl)-isocyanuric acid ester (meth)acrylate, pentaerythritol tri(meth)acrylate, pentaerythritol tetra(meth)acrylate, dipentaerythritol tri(meth)acrylate, dipentaerythritol penta(meth)acrylate, dipentaerythritol hexa(meth)acrylate, tripentaerythritol octa(meth)acrylate, tripentaerythritol hepta(meth)acrylate, 2-hydroxypropyl (meth)acrylate, 2-ethylhexyl (meth)acrylate, 2-norbornylmethyl (meth)acrylate, 2-hydroxy-3-phenoxypropyl (meth)acrylate, 2-hydroxyethyl (meth)acrylate, 2,2-dimethylbutyl (meth)acrylate, 2-hydroxybutyl (meth)acrylate, n-propyl (meth)acrylate, n-butyl (meth)acrylate, i-butyl (meth)acrylate, t-butyl (meth)acrylate, n-hexyl (meth)acrylate, n-pentyl (meth)acrylate, n-octyl (meth)acrylate, 2-methoxyethyl (meth)acrylate, 2-methoxymethoxyethyl (meth)acrylate, 3-pentyl (meth)acrylate, 3-methyl-2-norbornylmethyl (meth)acrylate, 3-methoxybutyl (meth)acrylate, 4-hydroxybutyl (meth)acrylate, 4-methyl-2-propylpentyl (meth)acrylate, 5-norbornen-2-ylmethyl (meth)acrylate, i-propyl (meth)acrylate, n-octadecyl (meth)acrylate, n-nonyl (meth)acrylate, sec-butyl (meth)acrylate, t-pentyl (meth)acrylate, α-hydroxymethylethyl (meth)acrylate, α-hydroxymethylbutyl (meth)acrylate, α-hydroxymethylmethyl (meth)acrylate, (meth)acrylic acid, n-stearyl (meth)acrylate, isooctyl (meth)acrylate, isononyl (meth)acrylate, isobornyl (meth)acrylate, ethyl (meth)acrylate, ethylcarbitol (meth)acrylate, ethoxyethyl (meth)acrylate, ethoxyethoxyethyl (meth)acrylate, ethoxydiethylene glycol (meth)acrylate, cyclohexyl (meth)acrylate, cyclohexylmethyl (meth)acrylate, cyclopentyl (meth)acrylate, dicyclopentenyloxyethyl (meth)acrylate, cetyl (meth)acrylate, tetrahydrofurfuryl (meth)acrylate, phenoxyethyl (meth)acrylate, (meth)acryloyloxyethyl hydrogen phthalate, benzyl (meth)acrylate, methyl (meth)acrylate, methoxyethyl (meth)acrylate, methoxyethoxyethyl (meth)acrylate, methoxypolyethylene glycol (meth)acrylate, lauryl (meth)acrylate, 1,3-butanediol di(meth)acrylate, 1,4-butanediol di(meth)acrylate, 1,6-hexanediol di(meth)acrylate, 1,9-nonanediol di(meth)acrylate, allylated cyclohexyl di(meth)acrylate, glycerin di(meth)acrylate, dicyclopentanyl di(meth)acrylate, tricyclodecanedimethanol di(meth)acrylate, trimethylolpropane di(meth)acrylate, neopentyl glycol adipate di(meth)acrylate, neopentyl glycol di(meth)acrylate, neopentyl glycol hydroxypivalic acid ester di(meth)acrylate, ethoxylated trimethylolpropane tri(meth)acrylate, glycerin propoxytri(meth)acrylate, trimethylolpropane polyethoxytri(meth)acrylate, propionic acid-modified dipentaerythritol tri(meth)acrylate, ditrimethylolpropane tetra(meth)acrylate, propionic acid-modified dipentaerythritol tetra(meth)acrylate, propoxylated pentaerythritol tetra(meth)acrylate, propionic acid-modified dipentaerythritol penta(meth)acrylate, glycidyl (meth)acrylate, N,N-dimethyl(meth)acrylamide, N,N-diethyl(meth)acrylamide, vinylbenzene, divinylbenzene, vinyltoluene, styrene, a-methylstyrene, and p-methylstyrene. For example, the term "ethylene glycol di(meth)acrylate" as used herein refers to both ethylene glycol diacrylate and ethylene glycol dimethacrylate.

Other examples of the polymerizable compound having an ethylenically unsaturated bond include urethane compounds that can be prepared by reaction between a polyvalent isocyanate compound and a hydroxyalkyl unsaturated carboxylic acid ester compound; compounds that can be prepared by reaction between a polyvalent epoxy compound and a hydroxyalkyl unsaturated carboxylic acid ester compound; diallyl ester compounds, such as diallyl phthalate; and divinyl compounds, such as divinyl phthalate.

The polymerizable compound having an epoxy ring may be a compound having one to six epoxy rings. A polymerizable compound having one to six epoxy rings can be produced from a compound having two or more hydroxy groups or carboxy groups, such as a diol compound, a triol compound, a dicarboxylic acid compound, or a tricarboxylic acid compound, and a glycidyl compound such as epichlorohydrin. The polymerizable compound having an epoxy ring may be a compound having two or more glycidyl ether structures or glycidyl ester structures.

Specific examples of the polymerizable compound having an epoxy ring include 1,4-butanediol diglycidyl ether, 1,2-epoxy-4-(epoxyethyl)cyclohexane, glycerol triglycidyl ether, diethylene glycol diglycidyl ether, 2,6-diglycidylphenyl glycidyl ether, 1,1,3-tris[p-(2,3-epoxypropoxy)phenyl]propane, 1,2-cyclohexanedicarboxylic acid diglycidyl ester, 4,4'-methylenebis(N,N-diglycidylaniline), 3,4-epoxycyclohexylmethyl-3,4-epoxycyclohexanecarboxylate, trimethylolethane triglycidyl ether, triglycidyl-p-aminophenol, tetraglycidylmetaxylenediamine, tetraglycidyl-1,3-bisaminomethylcyclohexane, bisphenol-A-diglycidyl ether, bisphenol-F-diglycidyl ether, bisphenol-S-diglycidyl ether, pentaerythritol tetraglycidyl ether resorcinol diglycidyl ether, diglycidyl phthalate ester, neopentyl glycol diglycidyl ether, polypropylene glycol diglycidyl ether, tetrabromobisphenol-A-diglycidyl ether, bisphenol hexafluoroacetone diglycidyl ether, pentaerythritol diglycidyl ether, hydrogenated bisphenol-A-diglycidyl ether, tris-(2,3-epoxypropyl) isocyanurate, 1-{2,3-di(propionyloxy)}-3,5-bis(2,3-epoxypropyl)-1,3,5-triazin-2,4,6(1H,3H,5H)-trione, 1,3-bis {2,3-di(propionyloxy)}-5-(2,3-epoxypropyl)-1,3,5-triazin-2,4,6 (1H,3H,5H)-trione, monoallyldiglycidyl isocyanurate, diglycerol polydiglycidyl ether, pentaerythritol polyglycidyl ether, 1,4-bis(2,3-epoxypropoxyperfluoroisopropyl)cyclohexane, sorbitol polyglycidyl ether, trimethylolpropane polyglycidyl ether, resorcin diglycidyl ether, 1,6-hexanediol diglycidyl ether, polyethylene glycol diglycidyl ether, phenyl glycidyl ether, p-tertiary butyl phenyl glycidyl ether, adipic acid diglycidyl ether, o-phthalic acid diglycidyl ether, dibromophenyl glycidyl ether, 1,2,7,8-diepoxyoctane, 1,6-dimethylol perfluorohexane diglycidyl ether, 4,4'-bis(2,3-epoxypropoxyperfluoroisopropyl) diphenyl ether, 2,2-bis(4-glycidyloxyphenyl)propane, 3,4-epoxycyclohexylmethyl-3',4'-epoxycyclohexane carboxylate, 3,4-epoxycyclohexyloxirane, 2-(3,4-epoxycyclohexyl)-3',4'-epoxy-1,3-dioxane-5-spirocyclohexane, 1,2-ethylenedioxy-bis(3,4-epoxycyclohexylmethane), 4',5'-epoxy-2'-methylcyclohexylmethyl-4,5-epoxy-2-methylcyclohexane carboxylate, ethylene glycol-bis(3,4-epoxycyclohexane carboxylate), bis-(3,4-epoxycyclohexylmethyl) adipate, and bis (2,3-epoxycyclopentyl) ether.

The polymerizable compound having an epoxy ring may be an ester-modified epoxy compound including a compound (i) having a functional group of the following Formula (2):

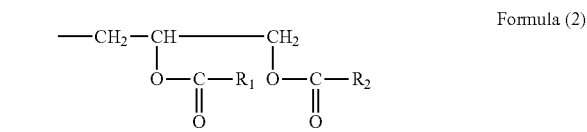

(wherein $R_1$ and $R_2$ are each independently an alkyl group, an alkenyl group, an alkynyl group, an aryl group, an aralkyl group, a heterocyclic group, or a halogenated, aminated, or nitrated derivative of any of these) in the molecule and a compound (ii) having a glycidyl group in the molecule.

The polymerizable compound having an oxetane ring may be a compound having one to six oxetane rings. Examples of the compound include 3-ethyl-3-hydroxymethyloxetane, 3-ethyl-3-(phenoxymethyl)oxetane, 3,3-diethyloxetane, 3-ethyl-3-(2-ethylhexyloxymethyl)oxetane, 1,4-bis(((3-ethyl-3-oxetanyl)methoxy)methyl)benzene, di((3-ethyl-3-oxetanyl)methyl) ether, and pentaerythritol tetrakis((3-ethyl-3-oxetanyl)methyl) ether.

The polymerizable compound having a vinyl ether structure may be a compound having one to six vinyl ether structures. Examples of the compound include vinyl-2-chloroethyl ether, vinyl-normal butyl ether, 1,4-cyclohexanedimethanol divinyl ether, vinyl glycidyl ether, bis(4-(vinyloxymethyl)cyclohexylmethyl) glutarate, tri(ethylene glycol) divinyl ether, adipic acid divinyl ester, diethylene glycol divinyl ether, tris(4-vinyloxy)butyl trimellilate, bis(4-(vinyloxy)butyl) terephthalate, bis(4-(vinyloxy)butyl isophthalate, ethylene glycol divinyl ether, 1,4-butanediol divinyl ether, tetramethylene glycol divinyl ether, tetraethylene glycol divinyl ether, neopentyl glycol divinyl ether, trimethylolpropane trivinyl ether, trimethylolethane trivinyl ether, hexanediol divinyl ether, 1,4-cyclohexanediol divinyl ether, tetraethylene glycol divinyl ether, pentaerythritol divinyl ether, pentaerythritol trivinyl ether, and cyclohexanedimethanol divinyl ether.

[Curing Agent (C)]

In the present invention, the curing agent (C) functions as an agent for curing the resin (B).

When the resin (B) is a polymerizable compound having an ethylenically unsaturated bond or a polymerizable compound having a vinyl ether structure, the curing agent (C) may be a radical polymerization initiator.

Examples of the radical polymerization initiator include azo compounds, such as azobisisobutyronitrile; and organic peroxides, such as di-tert-butyl peroxide and tert-butyl hydroperoxide.

When the resin (B) is a polymerizable compound having an epoxy ring or a polymerizable compound having an oxetane ring, the curing agent (C) may be, for example, an acid anhydride, an amine, or a diamine (polyamine).

Examples of the acid anhydride include aliphatic and aromatic tetracarboxylic dianhydrides.

Examples of the aliphatic tetracarboxylic dianhydride include methyltetrahydrophthalic anhydride, tetrahydrophthalic anhydride, methylnadic anhydride, hexahydrophthalic anhydride, and methylhexahydrophthalic anhydride.

Examples of the aromatic tetracarboxylic dianhydride include pyromellitic dianhydride, 3,3',4,4'-benzophenonetetracarboxylic dianhydride, 3,3',4,4'-biphenyl sulfone tetracarboxylic dianhydride, 1,4,5,8-naphthalenetetracarboxylic dianhydride, 2,3,6,7-naphthalenetetracarboxylic dianhydride, 3,3',4,4'-biphenyl ether tetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenylpropane dianhydride, 3,3',4,4'-perfluoroisopropylidenediphthalic dianhydride, 3,3',4,4'-biphenyltetracarboxylic dianhydride, 2,3,3',4'-biphenyltetracarboxylic dianhydride, bis(phthalic acid) phenylphosphine oxide dianhydride, p-phenylene-bis(triphenylphthalic) dianhydride, m-phenylene-bis(triphenylphthalic) dianhydride, bis(triphenylphthalic acid)-4,4'-diphenyl ether dianhydride, and bis(triphenylphthalic acid)-4,4'-diphenylmethane dianhydride. Among these aromatic tetracarboxylic dianhydrides, pyromellitic dianhydride is particularly preferred from the viewpoints of, for example, availability and versatility.

These acid anhydrides may be used alone or in combination of two or more species.

Examples of the amine include primary, secondary, and tertiary aliphatic amines, hybrid amines, aromatic amines, heterocyclic amines, nitrogen-containing compounds having a carboxy group, nitrogen-containing compounds having a sulfonyl group, nitrogen-containing compounds having a hydroxy group, nitrogen-containing compounds having a hydroxyphenyl group, alcoholic nitrogen-containing compounds, amides, imides, carbamates, ammonia, and ammonium salts.

Examples of the primary aliphatic amine include methylamine, ethylamine, n-propylamine, isopropylamine, n-butylamine, isobutylamine, sec-butylamine, tert-butylamine, pentylamine, tert-amylamine, cyclopentylamine, hexylamine, cyclohexylamine, heptylamine, octylamine, nonylamine, decylamine, dodecylamine, cetylamine, methylenediamine, ethylenediamine, and tetraethylenepentamine.

Examples of the secondary aliphatic amine include dimethylamine, diethylamine, di-n-propylamine, diisopropylamine, di-n-butylamine, diisobutylamine, di-sec-butylamine, dipentylamine, dicyclopentylamine, dihexylamine, dicyclohexylamine, diheptylamine, dioctylamine, dinonylamine, didecylamine, didodecylamine, dicetylamine, N,N-dimethylmethylenediamine, N,N-dimethylethylenediamine, and N,N-dimethyltetraethylenepentamine.

Examples of the tertiary aliphatic amine include trimethylamine, triethylamine, tri-n-propylamine, triisopropylamine, tri-n-butylamine, triisobutylamine, tri-sec-butylamine, tripentylamine, tricyclopentylamine, trihexylamine, tricyclohexylamine, triheptylamine, trioctylamine, trinonylamine, tridecylamine, tridodecylamine, tricetylamine, N,N,N',N'-tetramethylmethylenediamine, N,N,N',N'-tetramethylethylenediamine, and N,N,N',N'-tetramethyltetraethylenepentamine.

Examples of the hybrid amine include dimethylethylamine, methylethylpropylamine, benzylamine, phenethylamine, and benzyldimethylamine.

Specific examples of the aromatic amine and the heterocyclic amine include aniline derivatives (e.g., aniline, N-methylaniline, N-ethylaniline, N-propylaniline, N,N-dimethylaniline, 2-methylaniline, 3-methylaniline, 4-methylaniline, ethylaniline, propylaniline, trimethylaniline, 2-nitroaniline, 3-nitroaniline, 4-nitroaniline, 2,4-dinitroaniline, 2,6-dinitroaniline, 3,5-dinitroaniline, and N,N-dimethyltoluidine), diphenyl(p-tolyl)amine, methyldiphenylamine, triphenylamine, phenylenediamine, naphthylamine, diaminonaphthalene, pyrrole derivatives (e.g., pyrrole, 2H-pyrrole, 1-methylpyrrole, 2,4-dimethylpyrrole, 2,5-dimethylpyrrole, and N-methylpyrrole), oxazole derivatives (e.g., oxazole and isooxazole), thiazole derivatives (e.g., thiazole and isothiazole), imidazole derivatives (e.g., imidazole, 4-methylimidazole, and 4-methyl-2-phenylimidazole), pyrazole derivatives, furazan derivatives, pyrroline derivatives (e.g., pyrroline and 2-methyl-1-pyrroline), pyrrolidine derivatives (e.g., pyrrolidine, N-methylpyrrolidine, pyrrolidinone, and N-methylpyrrolidone), imidazoline derivatives, imidazolidine derivatives, pyridine derivatives (e.g., pyridine, methylpyridine, ethylpyridine, propylpyridine, butylpyridine, 4-(1-butylpentyl)pyridine, dimethylpyridine, trimethylpyridine, triethylpyridine, phenylpyridine, 3-methyl-2-phenylpyridine, 4-tert-butylpyridine, diphenylpyridine, benzylpyridine, methoxypyridine, butoxypyridine, dimethoxypyridine, 4-pyrrolidinopyridine, 2-(1-ethylpropyl)pyridine, aminopyridine, and dimethylaminopyridine), pyridazine derivatives, pyrimidine derivatives, pyrazine derivatives, pyrazoline derivatives, pyrazolinone derivatives, piperidine derivatives, piperazine derivatives, morpholine derivatives, indole derivatives, isoindole derivatives, 1H-indazole derivatives, indoline derivatives, quinoline derivatives (e.g., quinoline and 3-quinolinecarbonitrile), isoquinoline derivatives, cinnoline derivatives, quinazoline derivatives, quinoxaline derivatives, phthalazine derivatives, purine derivatives, pteridine derivatives, carbazole derivatives, phenanthridine derivatives, acridine derivatives, phenazine derivatives, 1,10-phenanthroline derivatives, adenine derivatives, adenosine derivatives, guanine derivatives, guanosine derivatives, uracil derivatives, and uridine derivatives.

Examples of the nitrogen-containing compound having a carboxy group include aminobenzoic acid, indolecarboxylic acid, and amino acid derivatives (e.g., nicotinic acid, alanine, arginine, aspartic acid, glutamic acid, glycine, histidine, isoleucine, glycylleucine, leucine, methionine, phenylalanine, threonine, lysine, 3-aminopyrazine-2-carboxylic acid, and methoxyalanine).

Examples of the nitrogen-containing compound having a sulfonyl group include 3-pyridinesulfonic acid and pyridinium p-toluenesulfonate.

Examples of the nitrogen-containing compound having a hydroxy group, the nitrogen-containing compound having a hydroxyphenyl group, and the alcoholic nitrogen-containing compound include 2-hydroxypyridine, aminocresol, 2,4-quinolinediol, 3-indolemethanol hydrate, monoethanolamine, diethanolamine, triethanolamine, N-ethyldiethanolamine, N,N-diethylethanolamine, triisopropanolamine, 2,2'-iminodiethanol, 2-aminoethanol, 3-amino-1-propanol, 4-amino-1-butanol, 4-(2-hydroxyethyl)morpholine, 2-(2-hydroxyethyl)pyridine, 1-(2-hydroxyethyl)piperazine, 1-[2-(2-hydroxyethoxy)ethyl]piperazine, piperidineethanol, 1-(2-hydroxyethyl)pyrrolidine, 1-(2-hydroxyethyl)-2-pyrrolidinone, 3-piperidino-1,2-propanediol, 3-pyrrolidino-1,2-propanediol, 8-hydroxyjulolidine, 3-quinuclidinol, 3-tropanol, 1-methyl-2-pyrrolidineethanol, 1-aziridineethanol, N-(2-hydroxyethyl)phthalimide, and N-(2-hydroxyethyl)isonicotinamide.

Examples of the amide include formamide, N-methylformamide, N,N-dimethylformamide, acetamide, N-methylacetamide, N,N-dimethylacetamide, propionamide, benzamide, and 1-cyclohexylpyrrolidone.

Examples of the imide include phthalimide, succinimide, and maleimide.

Examples of the carbamate include N-t-butoxycarbonyl-N,N-dicyclohexylamine, N-t-butoxycarbonylbenzimidazole, and oxazolidinone.

Examples of the ammonium cation include ammonium cation prepared by protonation of the nitrogen atom of, for example, ammonia, a primary, secondary, or tertiary aliphatic amine, a hybrid amine, an aromatic amine, a heterocyclic amine, a nitrogen-containing compound having a carboxy group, a nitrogen-containing compound having a sulfonyl group, a nitrogen-containing compound having a hydroxy group, a nitrogen-containing compound having a hydroxyphenyl group, or an alcoholic nitrogen-containing compound, and quaternary ammonium cation. Examples of the quaternary ammonium cation include tetraethylammonium and benzyltriethylammonium.

Examples of the aromatic diamine compound include p-phenylenediamine, m-phenylenediamine, 2,4-diaminotoluene, 4,4'-diaminobiphenyl, 4,4'-diamino-2,2'-bis(trifluoromethyl)biphenyl, 3,3'-diaminodiphenyl sulfone, 4,4'-diaminodiphenyl sulfone, 4,4'-diaminodiphenyl sulfide, 4,4'-diaminodiphenylmethane, 4,4'-diaminodiphenyl ether, 3,4'-diaminodiphenyl ether, 3,3'-diaminodiphenyl ether, 1,4-bis(4-aminophenoxy)benzene, 1,3-bis(4-aminophenoxy)benzene, 1,3-bis(3-aminophenoxy)benzene, 4,4'-bis(4-aminophenoxy)biphenyl, bis[4-(4-aminophenoxy)phenyl]sulfone, bis[4-(3-aminophenoxy)phenyl] sulfone, 2,2-bis[4-(4-aminophenoxy)phenyl]propane, and 2,2-bis[4-(4-aminophenoxy)phenyl]hexafluoropropane. Of these, 4,4'-diaminodiphenyl ether is preferred. These compounds may be used alone or in combination of two or more species.

<Production Method for Substrate>

The present invention is also directed to a method for producing a substrate, the method comprising a step of applying the aforementioned insulating composition (insulating composition containing the silica particles (A), the resin (B), and the curing agent (C)) onto a substrate, and a step of heating the composition.

The substrate used in the present invention may be a substrate formed of, for example, a metal (e.g., aluminum, copper, stainless steel, or silicon), glass, plastic, or glass cloth.

The aforementioned insulating composition can be applied onto the substrate by any method, such as spin coating, bar coating, potting, casting, or impregnation. The applied coating film may have a thickness of 100 nm to 5 mm. The applied coating film may be heated at 50 to 500° C.

The insulating composition of the present invention can be suitably used as an insulating resin for electronic materials, such as a semiconductor sealing material, an electronic material adhesive, a printed circuit board material, an interlayer insulating film material, and a power module sealing material, and used as an insulating resin in high-voltage devices, such as a power generator coil, a transformer coil, and a gas-insulating switching device.

EXAMPLES

The present invention will next be described in more detail by way of examples. However, the present invention is not limited to the following examples.

(Analytical Methods)

[Measurement of $SiO_2$ Concentration]

A target silica sol was placed in a crucible and dried at 130° C. Thereafter, the resultant gel was baked at 1,000° C., and the ignition residue was weighed to thereby calculate the $SiO_2$ concentration.

[Measurement of Average Primary Particle Diameter (Particle Diameter Measured by Nitrogen Adsorption Method)]

The specific surface area of powder prepared by drying of an acidic silica sol at 300° C. was measured with a specific surface area measuring device Monosorb (registered trademark) MS-16 (available from Yuasa Ionics Inc.), to thereby calculate the average primary particle diameter.

[Measurement of Water Content]

Water content was determined by the Karl Fischer titration method.

[Measurement of Viscosity]

The viscosity of a target silica sol was measured with a B-type rotational viscometer (available from Toki Sangyo Co., Ltd.).

[Measurement of Average Amount of Polyvalent Metal Element M: Ratio by Mole of M/Si]

A target silica sol was decomposed with hydrofluoric acid to thereby prepare a solution. The solution was subjected to ICP atomic emission spectroscopy (ICP-AES) to thereby measure the amounts of iron, aluminum, zinc, zirconium, and titanium contained in the silica sol. The thus-measured values were used to calculate the average amount of polyvalent metal element M contained in the silica sol: the ratio by mole of M/Si.

[Measurement of $Na_2O/SiO_2$ Mass Ratio in Particles]

A target silica sol was decomposed with hydrofluoric acid to thereby prepare a solution. The solution was subjected to atomic absorption spectrometry (AAS) to thereby measure the amount of $Na_2O$ contained in the silica sol (unit: ppm/$SiO_2$).

[Measurement of $Na_2O/SiO_2$ Mass Ratio on Particle Surface]

An acidic silica sol was collected (1.0 g as $SiO_2$) and diluted with pure water to 50 g, followed by adjustment of the pH to 1.9 with 8% by mass sulfuric acid and then retention at 23° C. for 4.5 hours. The resultant sol was charged into a centrifugal disposable ultrafiltration device (trade name CENTRICUT, available from KURABO INDUSTRIES LTD., cut-off molecular weight: 10,000) and centrifuged at 3,000 rpm for 30 minutes. The amount of Na contained in the resultant filtrate was measured by atomic absorption spectrometry. The thus-measured value was used to calculate the amount of $Na_2O$ on the particle surfaces (unit: ppm/$SiO_2$).

[Measurement of Amount of Eluted Na Ion]

A silica sol was charged into a Teflon (registered trademark) container and then diluted with pure water so as to achieve an $SiO_2$ concentration of 3.8% by mass, followed by heating in an autoclave at 121° C. for 20 hours. The resultant sol was charged into a centrifugal disposable ultrafiltration device (trade name CENTRICUT, available from KURABO INDUSTRIES LTD., cut-off molecular weight: 10,000) and centrifuged at 3,000 rpm for 30 minutes. The amount of Na contained in the resultant filtrate was measured by atomic absorption spectrometry. The thus-measured value was used to calculate the amount of Na ions eluted from the particles (unit: ppm/$SiO_2$).

Referential Example 1

A 100-L plastic container was charged with 9.6 kg of a sodium silicate solution (No. 3 Sodium Silicate, available from Fuji Chemical Co., Ltd., $SiO_2$ concentration: 29.1% by mass, ratio by mole of $SiO_2/Na_2O$: 3.2, ratio by mole of $Al_2O_3/SiO_2$: 0.0003) and 60.2 kg of pure water, and the mixture was stirred to achieve homogeneity. While the diluted sodium silicate solution was stirred with a disper, 1.98 kg of an aqueous sodium aluminate solution ($Al_2O_3$ concentration: 1.0% by mass, $Na_2O$ concentration: 0.77% by mass) was added to the sodium silicate solution, and the resultant mixture was stirred for 30 minutes. The resultant aqueous solution was caused to pass through a column filled with 24 L of a hydrogen-type strongly acidic cation exchange resin (Amberlite (registered trademark) IR-120B, available from ORGANO CORPORATION), to thereby prepare 70.0 kg of an active silicate solution ($SiO_2$ concentration: 3.7% by mass, pH: 2.8).

A 100-L stainless steel container having a reflux condenser, a stirrer, a heating unit, and one liquid injection port was charged with 0.31 kg of the aforementioned sodium silicate solution and 9.1 kg of pure water, and the mixture was heated to 90° C. to thereby prepare a liquid heel. While the liquid heel was maintained at 90° C., 69.6 kg of the aforementioned active silicate solution was added thereto through the liquid injection port at a constant flow rate over six hours. After completion of the addition, the resultant mixture was maintained at 90° C. for four hours, and then concentrated by ultrafiltration, to thereby prepare 9.0 kg of an alkaline silica sol 1 having an $SiO_2$ concentration of 28.5% by mass (average primary particle diameter (particle diameter measured by the nitrogen adsorption method): 11.3 nm, pH: 9.8).

The alkaline silica sol 1 was caused to pass sequentially through a column filled with 1.5 L of a hydrogen-type strongly acidic cation exchange resin (Amberlite (registered trademark) IR-120B, available from ORGANO CORPORATION), a column filled with 1.0 L of a hydroxyl group-type strongly basic anion exchange resin (Amberlite (registered trademark) IR-410, available from ORGANO CORPORATION), and a column filled with 300 mL of the hydrogen-type strongly acidic cation exchange resin (Amberlite IR-120B), to thereby prepare 10.0 kg of an acidic silica sol 1a ($SiO_2$ concentration: 25.0% by mass, average primary particle diameter: 11.3 nm, pH: 2.8, average amount of polyvalent metal element M: ratio by mole of M/Si: 0.0028, amount of Na ions eluted from particles: 41 ppm/$SiO_2$, $Na_2O/SiO_2$ mass ratio in particles: 1,486 ppm, $Na_2O/SiO_2$ mass ratio on particle surfaces: 569 ppm).

Example 1

In a 3-L stainless steel autoclave, 2,000 g of the acidic silica sol 1a prepared in Referential Example 1 was heated at 120° C. for six hours. The resultant sol was collected in a 3-L polyethylene-made wide-mouth bottle, and 50 g of 8% by mass sulfuric acid was added to the sol with stirring by a disper at 1,000 rpm, followed by stirring for 10 minutes. The resultant silica sol had a pH of 1.6. After the sol was allowed to stand still at 23° C. for 24 hours, the sol was caused to pass sequentially through a column filled with 100 mL of a hydrogen-type strongly acidic cation exchange resin (Amberlite IR-120B), a column filled with 250 mL of a hydroxyl group-type strongly basic anion exchange resin (Amberlite IR-410), and a column filled with 50 mL of the hydrogen-type strongly acidic cation exchange resin (Amberlite IR-120B) over two hours, to thereby prepare an acidic silica sol 1A (average primary particle diameter: 11.3 nm, $SiO_2$ concentration: 23.7% by mass, pH: 2.6, average amount of polyvalent metal element M: ratio by mole of M/Si: 0.0022, amount of Na ions eluted from particles: 9 ppm/$SiO_2$, $Na_2O/SiO_2$ mass ratio in particles: 869 ppm, $Na_2O/SiO_2$ mass ratio on particle surfaces: 318 ppm).

A glass-made reactor (inner volume: 3 L) having a stirrer, a condenser, a thermometer, and two inlet ports was charged with 2,000 g of the acidic silica sol 1A. While the sol in the reactor was maintained in a boiling state, methanol vapor generated in another boiler was continuously added to the silica sol in the reactor, whereby water was replaced with methanol while the liquid level was maintained almost constant. The replacement was completed when the volume of the distillate reached 20 L, to thereby prepare 1,840 g of a methanol-dispersed silica sol 1A. The methanol-dispersed silica sol 1A was found to have an $SiO_2$ concentration of 25.0% by mass, a water content of 0.6% by mass, and a viscosity of 2 mPa·s.

300 g of the methanol-dispersed silica sol 1A was collected in a 500-mL eggplant-shaped flask. While the silica sol was stirred with a magnetic stirrer, 18.5 g of phenyltrimethoxysilane (trade name: KBM-103, available from Shin-Etsu Chemical Co., Ltd.) was added to the silica sol, and the liquid temperature was maintained at 60° C. for two hours. After addition of 0.225 g of triamylamine (reagent available from Tokyo Chemical Industry Co., Ltd.), a surface-treated methanol-dispersed silica sol 1A was prepared.

To 294.9 g of the surface-treated methanol-dispersed silica sol 1A were added 300 g of methyl ethyl ketone and 123.2 g of bisphenol F epoxy resin (trade name: YDF-8170C, available from NIPPON STEEL & SUMIKIN CHEMICAL CO., LTD.), and the mixture was stirred until homogeneity was achieved. Thereafter, methanol and methyl ethyl ketone were removed with a rotary evaporator at 200 to 10 Torr and a bath temperature of 90° C., to thereby prepare a bisphenol F epoxy resin-dispersed silica sol 1A ($SiO_2$ concentration: 30.5% by mass, B-type viscosity (25° C.): 7,000 mPa·s, epoxy equivalent: 250 g/eq).

Example 2

A 2-L glass-made separable flask was charged with 652 g of the acidic silica sol 1a prepared in Referential Example 1 (average primary particle diameter: 11.3 nm, $SiO_2$ concentration: 25.0% by mass, pH: 2.8, average amount of polyvalent metal element M: ratio by mole of M/Si: 0.0028), and 978 g of pure water was added to the flask. Thereafter, 11.0 g of 10% aqueous sodium hydroxide solution was added, and the resultant mixture was stirred. The flask was heated to an internal temperature of 85° C., and 172 g of tetraethoxysilane was added dropwise to the flask over three hours. Subsequently, the mixture was heated at 85° C. for one hour, and then concentrated with a rotary evaporator until the $SiO_2$ concentration reached 23%. Thereafter, 850 g of the resultant sol was caused to pass through a column filled with 300 mL of a hydrogen-type strongly acidic cation exchange resin (Amberlite IR-120B) over one hour, to thereby prepare an acidic silica sol 2A (average primary particle diameter: 12.0 nm, $SiO_2$ concentration: 21.6% by mass, pH: 3.0, average amount of polyvalent metal element M: ratio by mole of M/Si: 0.0021, amount of Na ions eluted from particles: 17 ppm/$SiO_2$, $Na_2O/SiO_2$ mass ratio in particles: 1,263 ppm, $Na_2O/SiO_2$ mass ratio on particle surfaces: 340 ppm).

A glass-made reactor (inner volume: 1 L) having a stirrer, a condenser, a thermometer, and two inlet ports was charged with 500 g of the acidic silica sol 2A. While the sol in the reactor was maintained in a boiling state, methanol vapor generated in another boiler was continuously added to the silica sol in the reactor, whereby water was replaced with methanol while the liquid level was maintained almost constant. The replacement was completed when the volume of the distillate reached 5 L, to thereby prepare 430 g of a methanol-dispersed silica sol 2A. The methanol-dispersed silica sol 2A was found to have an $SiO_2$ concentration of 25.0% by mass, a water content of 0.6% by mass, and a viscosity of 2 mPa·s.

The same procedure as in Example 1 (i.e., surface treatment with phenyltrimethoxysilane and addition of bisphenol F epoxy resin) was performed, except that the methanol-dispersed silica sol 1A of Example 1 was replaced with the methanol-dispersed silica sol 2A, to thereby prepare a bisphenol F epoxy resin-dispersed silica sol 2A ($SiO_2$ concentration: 30.5% by mass, B-type viscosity (25° C.): 4,300 mPa·s, epoxy equivalent: 243 g/eq).

Example 3

A 2-L glass-made separable flask was charged with 652 g of the acidic silica sol 1a prepared in Referential Example 1 (average primary particle diameter: 11.3 nm, $SiO_2$ concentration: 25.0% by mass, pH: 2.8, average amount of polyvalent metal element M: ratio by mole of M/Si: 0.0028), and 978 g of pure water was added to the flask. Thereafter, 23.9 g of 10% aqueous sodium hydroxide solution was added, and the resultant mixture was stirred. The flask was heated to an internal temperature of 85° C., and 374 g of tetraethoxysilane was added dropwise to the flask over three hours. Subsequently, the mixture was heated at 85° C. for one hour, and then concentrated with a rotary evaporator until the $SiO_2$ concentration reached 23%. Thereafter, 868 g of the resultant sol was caused to pass through a column filled with 300 mL of a hydrogen-type strongly acidic cation exchange resin (Amberlite IR-120B) over one hour, to thereby prepare an acidic silica sol 3A (average primary particle diameter: 12.6 nm, $SiO_2$ concentration: 24.1% by mass, pH: 2.7, average amount of polyvalent metal element M: ratio by mole of M/Si: 0.0016, amount of Na ions eluted from particles: 32 ppm/$SiO_2$, $Na_2O/SiO_2$ mass ratio in particles: 1,103 ppm, $Na_2O/SiO_2$ mass ratio on particle surfaces: 153 ppm).

The same procedure as in Example 1 (i.e., methanol replacement, surface treatment with phenyltrimethoxysilane, and addition of bisphenol F epoxy resin) was performed, except that the acidic silica sol 2A of Example 2 was replaced with the acidic silica sol 3A, to thereby prepare a bisphenol F epoxy resin-dispersed silica sol 3A ($SiO_2$ concentration: 30.5% by mass, B-type viscosity (25° C.): 5,380 mPa·s, epoxy equivalent: 243 g/eq).

Comparative Example 1

The same procedure as in Example 1 (i.e., methanol replacement, surface treatment with phenyltrimethoxysilane, and addition of bisphenol F epoxy resin) was performed, except that 2,000 g of the acidic silica sol 1A of Example 1 was replaced with 1,900 g of the acidic silica sol 1a prepared in Referential Example 1, to thereby prepare a bisphenol F epoxy resin-dispersed silica sol 1a ($SiO_2$ concentration: 30.5% by mass, B-type viscosity (25° C.): 4,800 mPa·s, epoxy equivalent: 247 g/eq).

Each of the bisphenol F epoxy resin-dispersed silica sols prepared in Examples 1 to 3 and Comparative Example 1 was mixed with an optional epoxy resin (bisphenol F epoxy resin, trade name: YDF-8170C, available from NIPPON STEEL & SUMIKIN CHEMICAL CO., LTD.), an acid anhydride (RIKACID MH-700, available from New Japan Chemical Co., Ltd.) serving as a curing agent, and a reaction promoter (dimethylbenzylamine, available from Tokyo Chemical Industry Co., Ltd.) in proportions shown in Table 1, to thereby prepare an epoxy resin curing composition.

The epoxy resin curing composition was applied to a cast plate (glass plate having a thickness of 3 mm treated with a fluorine-containing mold release agent (product name: Optool DSX, available from DAIKIN INDUSTRIES, Ltd.)) and heated under the following curing conditions (at 70° C. for two hours, subsequently at 90° C. for two hours, and then at 150° C. for eight hours), to thereby prepare an epoxy resin cured product.

In the following description, the aforementioned Example Nos. and Comparative Example No. of the bisphenol F epoxy resin-dispersed silica sols are also regarded as those of epoxy resin curing compositions and their cured products.

TABLE 1

|  | Example 1 | Example 2 | Example 3 | Comparative Example 1 |
|---|---|---|---|---|
| Epoxy resin (g) | — | 23.8 | 23.8 | 23.8 |
| Epoxy resin-dispersed silica sol (g) | 61.7 | 32.9 | 32.9 | 32.9 |
| Curing agent (g) | 37.9 | 42.8 | 42.8 | 42.8 |
| Reaction promoter (g) | 0.4 | 0.5 | 0.5 | 0.5 |
| $SiO_2$ content (% by mass) | 18.8 | 10.0 | 10.0 | 10.0 |

(Measurement of Dielectric Breakdown Life of Epoxy Resin Cured Product)

Each cured product was formed into sheet samples each having a size of 140 mm×140 mm and a thickness (t) of 1 mm. The dielectric breakdown life of each sample was measured with a dielectric breakdown tester (model: YST-243WS, available from Yamayo Shikenki) at a test temperature of 110° C. (in air) and test voltages (applied voltages) of 20 kV, 15 kV, and 10 kV. The test involved the use of a lower flat plate electrode (ϕ=25 mm) and an upper spherical electrode (ϕ=20 mm), and these electrodes were arranged so as to come into contact with the sample. The dielectric breakdown lives of samples (n=3 or 4) were measured at each voltage, and each applied voltage V [kV/mm] was plotted against the corresponding dielectric breakdown life t (hr), to thereby prepare a V-t plot. The presumed dielectric breakdown life (h: hour) at 5 kV was calculated by extrapolation of the V-t plot.

For comparison, a cured product (blank) was prepared from an epoxy resin composition containing only a silica-free epoxy resin and a curing agent. The dielectric breakdown life of the cured product was measured, and the presumed dielectric breakdown life of the cured product was calculated.

Figure 2:
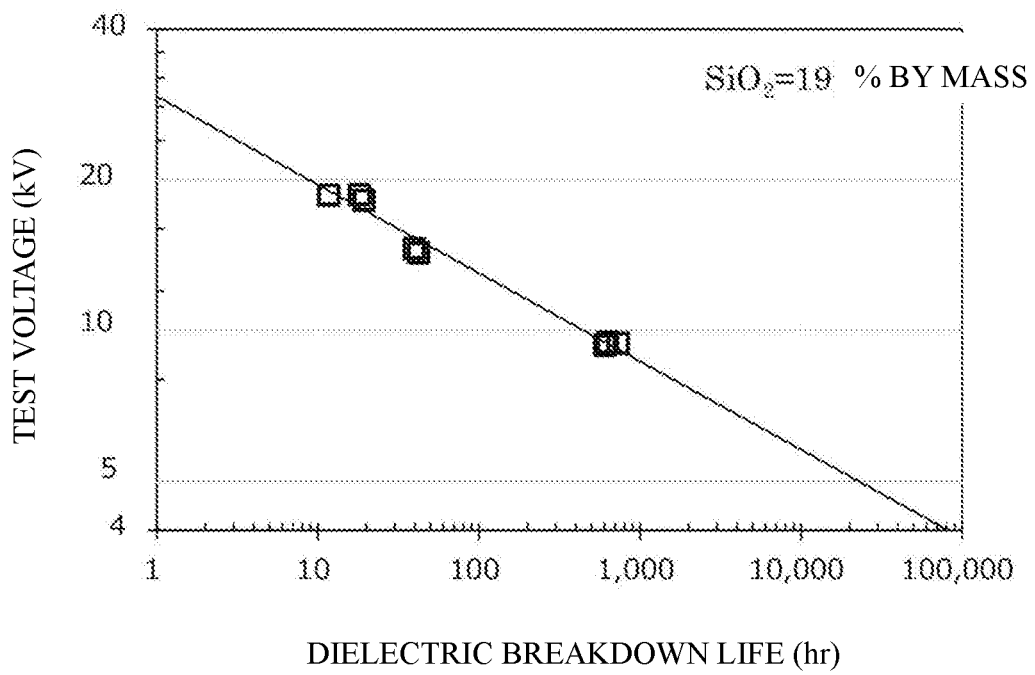
FIG. 2 shows the dielectric breakdown life of a cured product produced from an epoxy resin composition containing a silica sol 1A prepared in Example 1 (i.e., containing silica particles, an epoxy resin, and a curing agent) at an applied voltage of 20 kV, 15 kV, or 10 kV, and the presumed dielectric breakdown life of the cured product at 5 kV.
Figure 3:
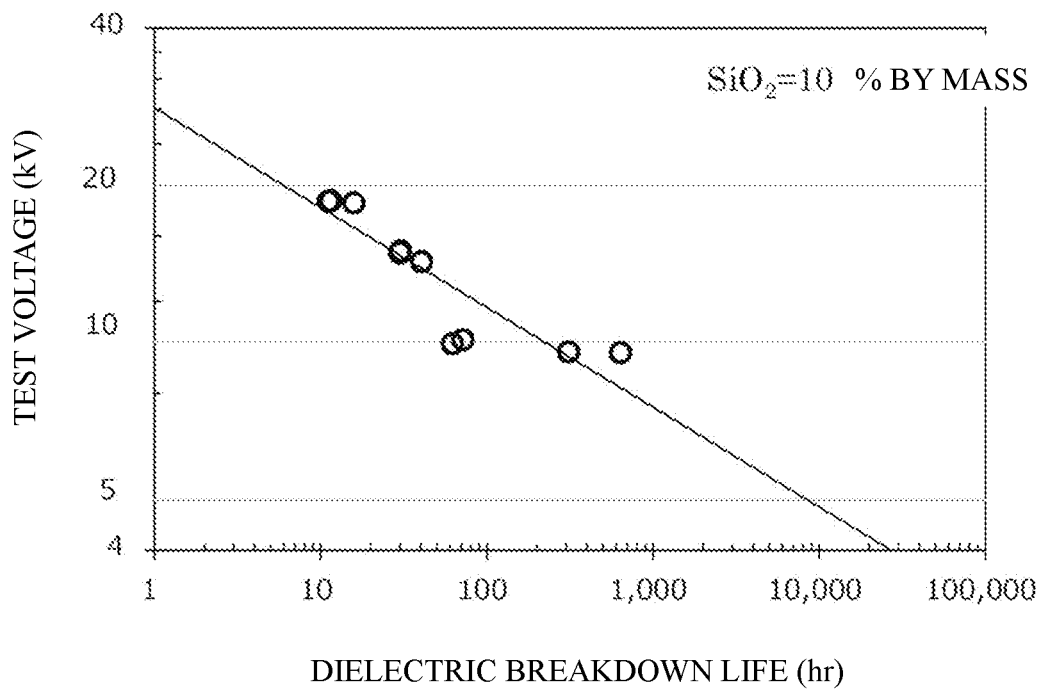
FIG. 3 shows the dielectric breakdown life of a cured product produced from an epoxy resin composition containing a silica sol 2A prepared in Example 2 (i.e., containing silica particles, an epoxy resin, and a curing agent) at an applied voltage of 20 kV, 15 kV, or 10 kV, and the presumed dielectric breakdown life of the cured product at 5 kV.
Figure 4:
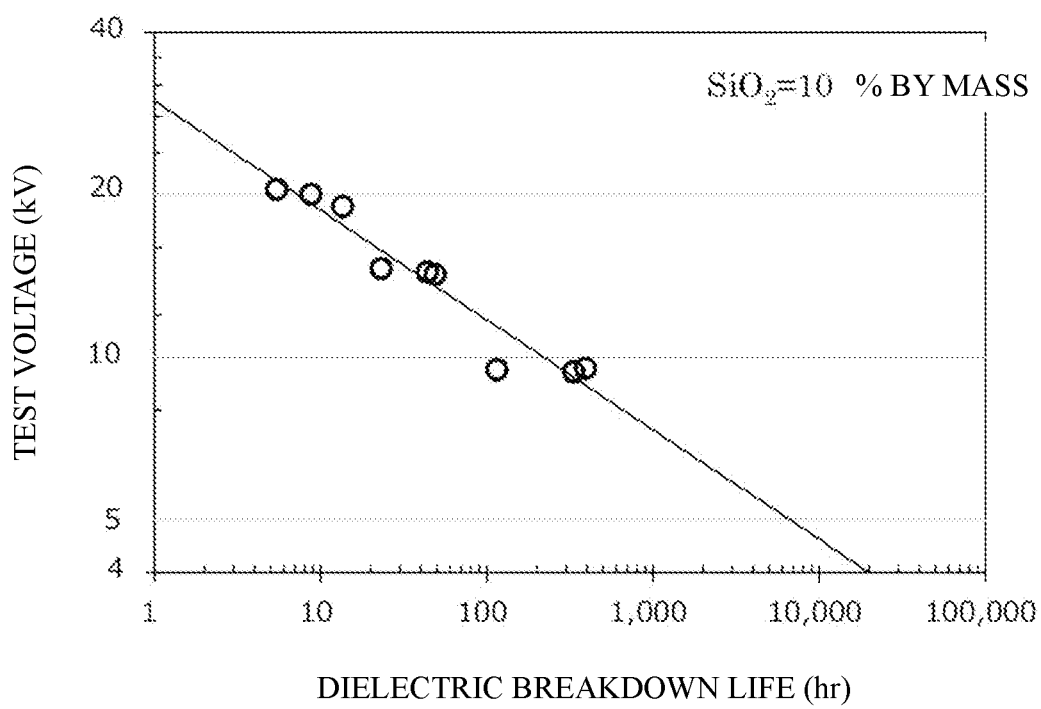
FIG. 4 shows the dielectric breakdown life of a cured product produced from an epoxy resin composition containing a silica sol 3A prepared in Example 3 (i.e., containing silica particles, an epoxy resin, and a curing agent) at an applied voltage of 20 kV, 15 kV, or 10 kV, and the presumed dielectric breakdown life of the cured product at 5 kV.
Figure 5:
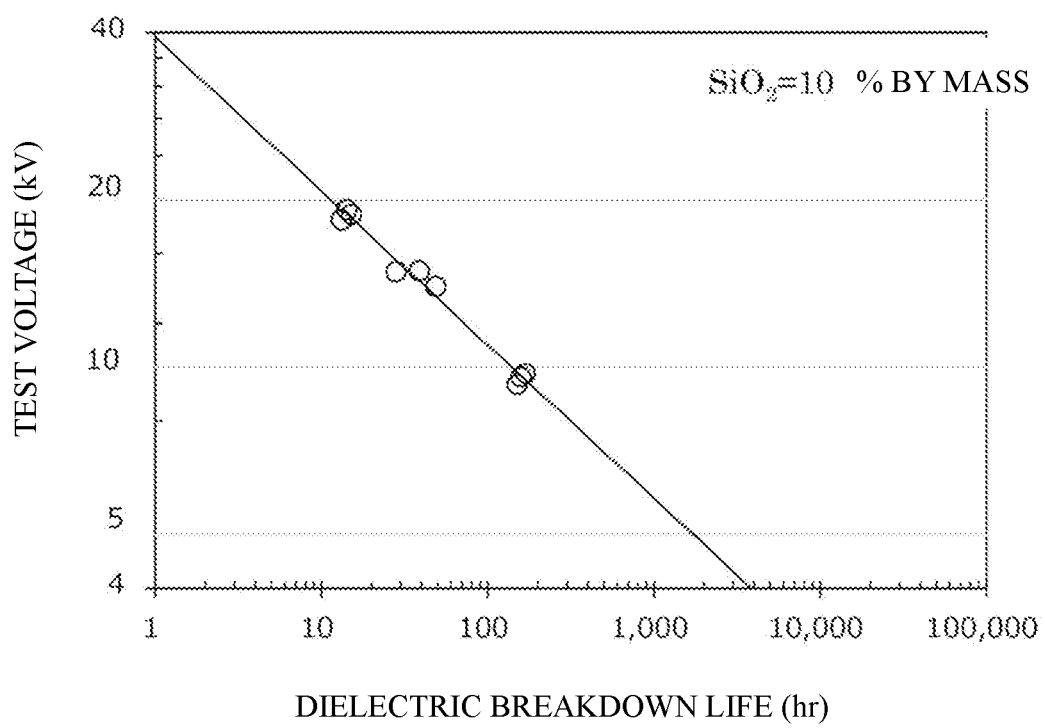
FIG. 5 shows the dielectric breakdown life of a cured product produced from an epoxy resin composition containing a silica sol 1a prepared in Comparative Example 1 (i.e., containing silica particles, an epoxy resin, and a curing agent) at an applied voltage of 20 kV, 15 kV, or 10 kV, and the presumed dielectric breakdown life of the cured product at 5 kV.

The resultant V-t plots are shown in FIG. 1 (blank), FIG. 2 (Example 1), FIG. 3 (Example 2), FIG. 4 (Example 3), and FIG. 5 (Comparative Example 1). The presumed dielectric breakdown lives at 5 kV are shown in Table 2.

TABLE 2

|  | Blank | Example 1 | Example 2 | Example 3 | Comparative Example 1 |
|---|---|---|---|---|---|
| Epoxy resin-dispersed silica sol (type) | — | 1A | 2A | 3A | 1a |
| $SiO_2$ content (% by mass) | 0 | 18.8 | 10.0 | 10.0 | 10.0 |

TABLE 2-continued

| | Blank | Example 1 | Example 2 | Example 3 | Comparative Example 1 |
|---|---|---|---|---|---|
| Presumed dielectric breakdown life at 5 kV (h) | 1300 | 23385 | 8502 | 6742 | 1727 |

As shown in FIG. 2 (Example 1), FIG. 3 (Example 2), and FIG. 4 (Example 3), the composition of the present invention achieved a long dielectric breakdown life at 10 kV and exhibited a moderate decrease in dielectric breakdown life in association with an increase in applied voltage (test voltage), as compared with the case of the compositions of the blank (FIG. 1) and Comparative Example 1 (FIG. 5).

The presumed dielectric breakdown lives at 5 kV were calculated from the aforementioned results (Table 2). The results indicate that the composition of the present invention probably exhibits voltage resistance over a long period of time, as compared with the compositions of the blank and Comparative Example 1.

INDUSTRIAL APPLICABILITY

The present invention can provide an insulating composition containing silica particles, a resin, and a curing agent, wherein elution of Na ions from the silica particles is reduced, and the composition undergoes no change in insulating property over time.

The invention claimed is:

1. An insulating composition comprising silica particles (A), a resin (B), and a curing agent (C), wherein:
   the silica particles (A) have a property that when an aqueous sol formed from the silica particles (A), excluding the resin (B) and the curing agent (C), having an $SiO_2$ concentration of 3.8% by mass, is heated at 121° C. for 20 hours, an amount of Na ions eluted from the silica particles (A) is 40 ppm/$SiO_2$ or less;
   the silica particles (A) contain a polyvalent metal oxide such that a ratio by mole of a polyvalent metal M to Si is 0.001 to 0.02;
   a mass ratio of $Na_2O/SiO_2$ in the silica particles (A) is 700 ppm to 1,300 ppm, but wherein surface regions, having a thickness of from 0.1 nm to 1.5 nm as measured from the surface of the silica particles (A), have a $Na_2O/SiO_2$ mass ratio of 10 ppm to 400 ppm; and
   the silica particles (A) have an average particle diameter of from 5 nm to 40 nm.

2. The insulating composition according to claim 1, wherein the amount of Na ions eluted from the silica particles (A) after the heating is 5 to 38 ppm/$SiO_2$.

3. The insulating composition according to claim 1, wherein the silica particles (A) are produced in a process comprising:
   a step of preparing an aqueous dispersion of silica particles (a) by heating a silicate liquid obtained by cation exchange of an aqueous alkali silicate solution, and the following steps (I) and (II):
   step (I): a step of subjecting the aqueous dispersion of the silica particles (a) to heating at 100 to 200° C., and optionally also a step of maintaining the aqueous dispersion at room temperature to 50° C. under acidic conditions with a pH of 1 to 4; and
   step (II): a step of subjecting the aqueous dispersion of the silica particles (a) that has been subjected to the step (I) to the following step (II-i) or (II-ii):
      step (II-i): a step of performing cation exchange and anion exchange sequentially, or
      step (II-ii): a step of performing cation exchange, anion exchange, and cation exchange sequentially.

4. A method for producing the insulating composition according to claim 1, the method comprising:
   a step of preparing the aqueous sol of silica particles (A);
   a step (1) of replacing the aqueous medium of the aqueous sol of the silica particles (A) with an organic medium, to produce an organic medium sol of the silica particles (A); and
   a step (2) of mixing the organic medium sol of the silica particles (A) produced in the step (1) with a resin (B) and a curing agent (C).

5. The method for producing the insulating composition according to claim 4, wherein the aqueous sol of the silica particles (A) is produced through:
   a step of preparing an aqueous dispersion of silica particles (a) by heating a silicate liquid obtained by cation exchange of an aqueous alkali silicate solution, and the following steps (I) and (II):
   step (I): a step of subjecting the aqueous dispersion of the silica particles (a) to any one of the following steps (I-i) to (I-iii):
      step (I-i): a step of maintaining the aqueous dispersion at room temperature to 50° C. under acidic conditions with a pH of 1 to 4,
      step (I-ii): a step of heating the aqueous dispersion at 100 to 200° C., and
      step (I-iii): combination of the steps (I-i) and (I-ii); and
   step (II): a step of subjecting the aqueous dispersion of the silica particles (a) that has been subjected to the step (I) to the following step (II-i) or (II-ii):
      step (II-i): a step of performing cation exchange and anion exchange sequentially, or
      step (II-ii): a step of performing cation exchange, anion exchange, and cation exchange sequentially.

6. The method for producing the insulating composition according to claim 5, wherein the pH is adjusted to 1 to 4 in the step (I-i) by adding an acid to the aqueous dispersion of the silica particles (a).

7. The method for producing the insulating composition according to claim 4, wherein the aqueous sol of the silica particles (A) is produced through: a step of preparing an aqueous dispersion of silica particles (a) by heating a silicate liquid obtained by cation exchange of an aqueous alkali silicate solution, and a step of adding, to the aqueous dispersion of the silica particles (a), a silane compound of the following Formula (1):

$$R_aSiX_{(4-a)} \quad \text{Formula (1)}$$

to coat the surfaces of the silica particles (a) with a hydrolysis product or hydrolysis condensate of the silane compound of Formula (1); wherein R is a C1 1 alkyl group, an epoxy group, an epoxy group-containing organic group, a phenyl group, a phenyl group-containing organic group, or any combination of these, and is bonded to the silicon atom via a Si—C bond; a is an integer of 0 to 3; and X is an alkoxy group, an acyloxy group, or a halogen group.

8. The method for producing the insulating composition according to claim 7, wherein the step of coating the silica particles (a) with the hydrolysis product or hydrolysis condensate of the silane compound of Formula (1) comprises:

a step of coating the silica particles (a) with a hydrolysis product or hydrolysis condensate of the silane compound of Formula (1) wherein a is 0; and a step of further coating the silica particles (a) with a hydrolysis product or hydrolysis condensate of the silane compound of Formula (1) wherein a is 1 or 2.

9. The method for producing the insulating composition according to claim 7, wherein the silane compound of Formula (1) with a equal to 0 is tetraethoxysilane or tetramethoxysilane, and the silane compound of Formula (1) with a equal to 1 or 2 is a silane having an epoxy group-containing organic group, is a silane having a phenyl group, or is a combination of these.

10. The method for producing the insulating composition according to claim 7, wherein the mass ratio of the silica particles (a) to the hydrolysis product or hydrolysis condensate of the silane compound of Formula (1) is 100:2 to 100:100.

11. A method for producing a substrate, the method comprising a step of applying the insulating composition according to claim 1 onto a substrate, and a step of heating the composition.

\* \* \* \* \*